(12) United States Patent
Biondo et al.

(10) Patent No.: US 7,594,674 B1
(45) Date of Patent: Sep. 29, 2009

(54) VEHICLE INSTRUMENT PANEL WITH TOP-MOUNT AIRBAG DEPLOYMENT DOOR HAVING CONTACT BEND INITIATOR

(75) Inventors: William A. Biondo, Beverly Hills, MI (US); Virginia J. Hughes, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/134,586

(22) Filed: Jun. 6, 2008

(51) Int. Cl.
B60R 21/20 (2006.01)
(52) U.S. Cl. .................................. 280/728.3
(58) Field of Classification Search ............. 280/728.3, 280/732
See application file for complete search history.

(56) References Cited

U.S. PATENT DOCUMENTS

| | | | |
|---|---|---|---|
| 5,320,381 A * | 6/1994 | Barnes et al. | 280/728.3 |
| 6,357,787 B2 * | 3/2002 | Lorenz et al. | 280/728.3 |
| 6,443,483 B2 * | 9/2002 | Ellerbrok | 280/728.3 |
| 6,601,870 B2 * | 8/2003 | Suzuki et al. | 280/728.3 |
| 6,742,804 B2 * | 6/2004 | Suzuki et al. | 280/728.3 |

\* cited by examiner

Primary Examiner—Faye M. Fleming
(74) Attorney, Agent, or Firm—Quinn Law Group, PLLC.

(57) ABSTRACT

An interior trim arrangement is provided that is adapted to house a supplemental inflatable restraint (SIR) system when installed in a motorized vehicle. The trim arrangement includes a trim panel configured to attach to the vehicle. The trim panel has opposing inner and outer surfaces that define an upper portion adjacent to a middle portion. The trim panel defines a cavity with an opening formed through the upper portion. The cavity is configured to nest the SIR system therein. A deployment door is integrated into the trim panel, and configured to transition from a closed position, in which the door covers the opening, to an open position, in which the door sufficiently uncovers the opening such that the inflatable cushion can deploy therethrough. The deployment door includes one or more bend initiators that are configured to attenuate kinetic energy transferred to the windshield by the deployment door upon contact therebetween.

18 Claims, 3 Drawing Sheets

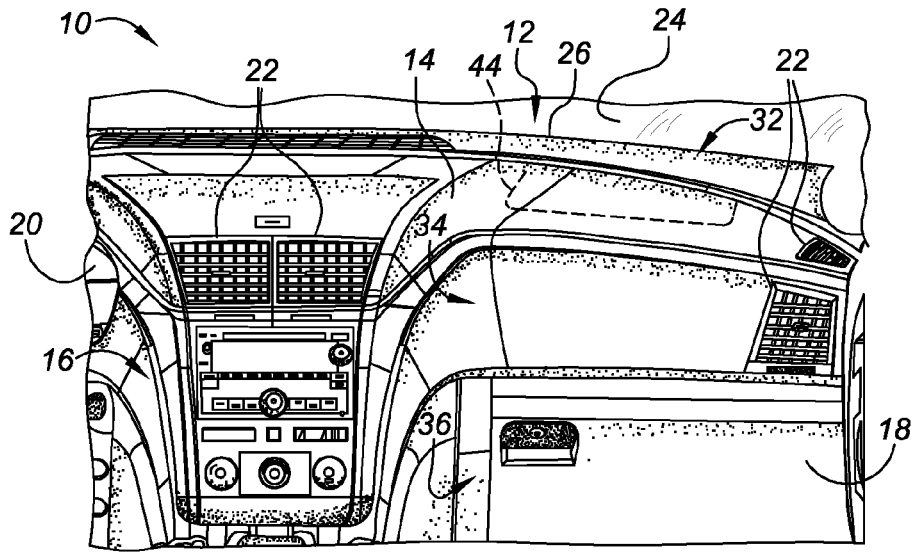
FIG. 1
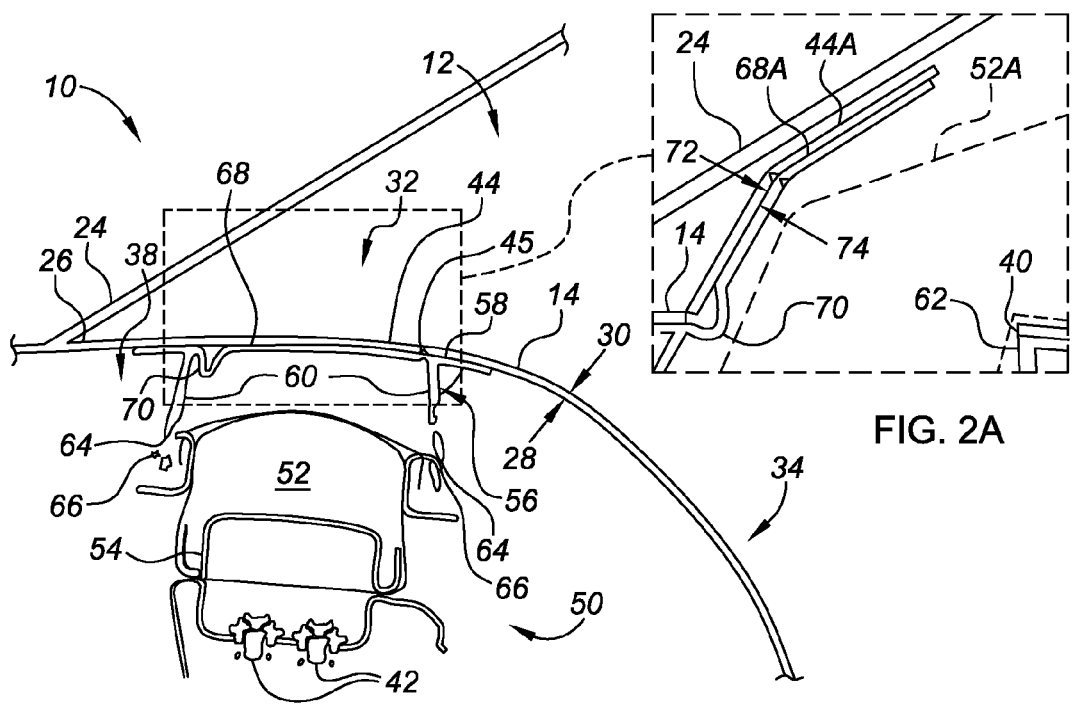
FIG. 2A
FIG. 2

VEHICLE INSTRUMENT PANEL WITH TOP-MOUNT AIRBAG DEPLOYMENT DOOR HAVING CONTACT BEND INITIATOR

TECHNICAL FIELD

The present invention relates generally to inflatable restraint systems for motorized vehicles, and more particularly to interior trim arrangements with a top-mount deployment door for covering and concealing a supplemental inflatable restraint system.

BACKGROUND OF THE INVENTION

Inflatable airbag devices, which are more commonly referred to in the art as Supplementary Restraint Systems (SRS), Air Cushion Restraint Systems (ACRS), or Supplemental Inflatable Restraint (SIR) Systems, are originally equipped in almost all present day automotive vehicles. Included as part of an overall occupant restraint system, airbag devices are generally located in the vehicle passenger compartment, and act as a selectively deployable cushion capable of attenuating occupant kinetic energy. Moreover, airbags are designed to minimize inadvertent movement of the driver and/or other occupants to help avoid involuntary contact with interior portions of the automobile.

Traditional airbag devices comprise an inflatable airbag module stored behind the vehicle instrument panel (e.g., for passenger-side airbags), or mounted to the center hub of the steering wheel (e.g., for driver-side airbags). A plurality of sensors or similar devices is strategically located throughout the vehicle to detect the onset of a predetermined activation event. The sensor(s) responsively activates an inflation device, internally located in the airbag module, to produce a flow of inflating gas into an inflatable flexible membrane (i.e., an airbag cushion), which is normally folded inside of the airbag module. This causes the airbag cushion to deploy in a rearward direction within the vehicle passenger compartment.

Most front passenger-side SIR systems are disposed within and behind the instrument panel, which extends across the width of the vehicle passenger compartment, at the forward most end thereof. The instrument panel traditionally utilizes a deployment door to cover an opening formed in the instrument panel for the airbag cushion to deploy through. The airbag door is designed to open in response to the force of the expanding airbag cushion. That is, as the pressure in the airbag cushion increases, a force is generated along an underside surface of the deployment door. At least a portion of the door then selectively separates from the remaining portion of the instrument panel to permit the airbag cushion to deploy through the opening in the instrument panel, into the vehicle passenger compartment.

Common deployment locations for passenger-side front airbag devices include the top, generally horizontal surface of the instrument panel, or the rearward-facing, generally vertical surface of the instrument panel. Deployment doors located along the top, generally horizontal surface of the instrument panel are referred to as "top-mount" doors, whereas deployment doors located along the rearward-facing, generally vertical surface of the instrument panel are referred to as "mid-mount" doors. Top-mount deployment doors are commonly designed to pivot along a forward edge of the door so that the door swings upwardly and toward the automobile's windshield.

SUMMARY OF THE INVENTION

According to one embodiment of the present invention, an interior trim arrangement is provided that is adapted, at least in part, to house a supplemental inflatable restraint (SIR) system therein when installed in a motorized vehicle. The trim arrangement includes a trim panel configured to attach to the vehicle. The trim panel has opposing inner and outer surfaces that define an upper portion adjacent to a middle portion. The trim panel also defines a cavity with an opening formed through the upper portion. The cavity is configured to nest the supplemental inflatable restraint system therein.

A deployment door is integrated with (i.e., formed in or attached to) the trim panel. The deployment door is configured to transition from a closed position, in which the deployment door substantially covers the opening, to a generally open position, in which the deployment door sufficiently uncovers the opening such that the inflatable cushion of the SIR system can selectively deploy therethrough. The deployment door includes at least one bend initiator that is formed therein. Each bend initiator is configured to attenuate kinetic energy transferred to the vehicle windshield by the deployment door upon contact therebetween.

According to one aspect of this embodiment, the bend initiator includes a reduced thickness portion extending generally laterally along at least a portion of the deployment door. In addition, the bend initiator may, in actuality, consist of a plurality of bend initiators.

According to another aspect, the trim arrangement also includes a soft chute that is mounted to the inner surface of the trim panel. The soft chute is mounted to the trim panel such that an aperture defined through an upper portion thereof is generally aligned with the opening formed through the trim panel. The soft chute is configured to operatively align the inflatable cushion with the opening for deployment therethrough. A soft chute door is integrated with the soft chute, and configured to transition from a first position, in which the soft chute door substantially obstructs the opening, to a second position, in which the soft chute door sufficiently exposes the opening such that the inflatable cushion can selectively deploy therethrough.

Similar to the deployment door, the soft chute door preferably also includes at least one bend initiator that is formed therein, and configured to further attenuate kinetic energy transferred to the windshield by the deployment door upon contact therebetween. Similar to the bend initiators formed in the deployment door, the bend initiators formed in the soft chute door includes a reduced thickness portion that extends generally laterally along at least a portion of the soft chute door. The bend initiator formed in the soft chute door may, in actuality, consist of a plurality of bend initiators. The soft chute door preferably pivots about a generally laterally oriented hinge portion to transition from the first position to the second position. In addition, an outer interface surface of the soft chute door preferably abuts against an inner interface surface of the deployment door.

In accordance with another aspect of this embodiment, the deployment door is a U-shaped door. Moreover, the deployment door is preferably integrally formed into the trim panel.

In accordance with yet another aspect of this embodiment, the upper portion of the trim panel is oriented forward of, and oblique to the middle portion relative to the vehicle. In a similar regard, the upper portion is generally horizontal and the middle portion is generally vertical.

According to another embodiment of the present invention, an interior trim arrangement is provided that is adapted to house a supplemental inflatable restraint system therein when installed in a motorized vehicle. The instrument panel includes a trim panel configured to attach to the vehicle. The trim panel has opposing inner and outer surfaces that define an upper portion adjacent to a middle portion. The trim panel also defines a cavity with an opening formed through the upper portion thereof. The cavity is configured to nest the supplemental inflatable restraint system therein. A deployment door is integrated with the trim panel, and configured to transition from a closed position, in which the deployment door substantially covers the opening, to a generally open position, in which the deployment door sufficiently uncovers the opening such that the inflatable cushion of the SIR system can selectively deploy therethrough.

A soft chute is mounted to the inner surface of the trim panel such that an aperture defined through an upper portion thereof is generally aligned with the opening. The soft chute is configured to attach the supplemental inflatable restraint system to the trim panel, and operatively align the inflatable cushion of the SIR system with the opening. A soft chute door is integrated with the soft chute, and configured to transition from a first position, in which the soft chute door substantially obstructs the opening, to a second open position, in which the soft chute door sufficiently exposes the opening such that the inflatable cushion can selectively deploy therethrough. The deployment door, the soft chute door, or both includes one or more bend initiators that are configured to attenuate kinetic energy transferred to the windshield by the deployment door upon contact therebetween.

In accordance with another embodiment of the present invention, a vehicle is provided that has a passenger compartment and a front windshield. The vehicle also includes an instrument panel operatively oriented at a forward end of the passenger compartment. The instrument panel has opposing inner and outer surfaces that define an upper portion positioned forward of, and oblique to a middle portion. The instrument panel defines a cavity with an opening formed through the upper portion thereof.

An inflatable cushion is operable to transition through the opening from a non-expanded state, in which the cushion is nested inside of the cavity, to an expanded state, in which the cushion is substantially outside of the cavity. A fluid dispensing apparatus is in fluid communication with the cushion, and operates to regulate the selective transition of the cushion from the non-expanded state to the expanded state.

A deployment door is integrated with the instrument panel, and configured to transition in a forward motion from a closed position, in which the deployment door substantially covers the opening, to a generally open position, in which the deployment door sufficiently uncovers the opening such that the inflatable cushion can deploy therethrough when transitioning from the non-expanded state to the expanded state. The deployment door includes a reduced thickness portion that is formed in, and extending generally laterally along at least a portion of an inside surface thereof. The reduced thickness portion is configured to weaken the deployment door and thereby collapse the same in response to a predetermined force transferred thereto by the windshield upon contact therebetween.

According to one aspect of this embodiment, the vehicle also includes a soft chute that is mounted to the inner surface of the instrument panel. The soft chute defines an aperture through an upper reinforcing portion thereof that is generally aligned with the opening formed through the instrument panel. The soft chute is configured to operatively attach to and align the inflatable cushion with the opening in the instrument panel.

A soft chute door is integrated with the soft chute, and configured to transition in a forward motion from a first position, in which the soft chute door substantially obstructs the opening, to a second position, in which the soft chute door sufficiently exposes the opening such that the inflatable cushion can selectively deploy therethrough. The soft chute door preferably includes a second reduced thickness portion that is formed in, and extends generally laterally along at least a portion of an interior surface thereof. The second reduced thickness portion is configured to weaken the soft chute door and thereby collapse the same in response to a second predetermined force transferred thereto by the windshield upon contact therebetween.

The above features and advantages, and other features and advantages of the present invention, will be readily apparent from the following detailed description of the preferred embodiments and best modes for carrying out the present invention when taken in connection with the accompanying drawings.

BRIEF DESCRIPTION OF THE DRAWINGS

FIG. 1 is a perspective-view illustration inside of the passenger compartment of a representative motorized vehicle depicting a vehicle instrument panel with a top-mount deployment door in accordance with the present invention;

FIG. 2 is a side-view illustration of the instrument panel of FIG. 1 cut-away to depict a supplemental inflatable restraint system with soft chute housed therein;

FIG. 2A is an enlarged side-view illustration of the top-mount deployment door and soft chute door of FIG. 2 depicted in respective open positions;

DESCRIPTION OF THE PREFERRED EMBODIMENTS

Figure 3:
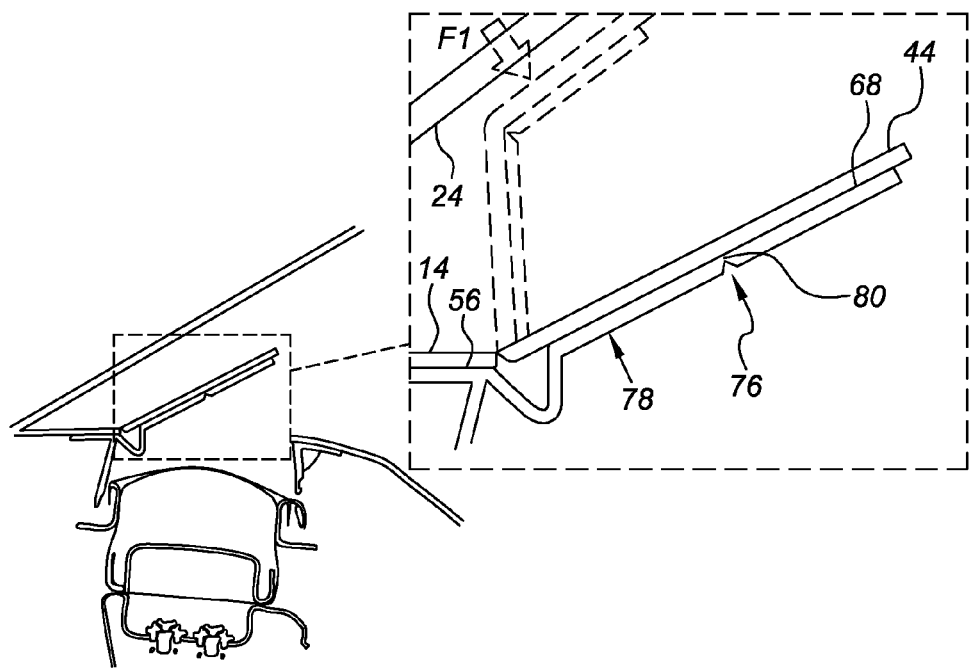
FIG. 3 is an enlarged side-view illustration of the top-mount deployment door and soft chute door of FIG. 2 depicting the soft chute door with a bend initiator in accordance with one embodiment of the present invention.

Referring to the drawings, wherein like reference numbers refer to like components throughout the several views, FIG. 1 is a perspective-view illustration of the forward portion of a passenger compartment in a representative motorized vehicle, identified generally as 10, with which the present invention may be incorporated and utilized. It should be readily understood that FIG. 1 is merely an exemplary application by which the present invention may be practiced. As such, the present invention is by no means limited to the particular structure or arrangement presented in FIG. 1. By way of example, and not limitation, the interior trim arrangements of the present invention can be incorporated into any motorized vehicle, such as coupe- or sedan-type passenger cars, light trucks, sport utility vehicles, heavy duty vehicles, vans, buses, airplanes, trains, etc. In addition, the drawings presented herein are not to scale, and are provided purely for explanatory purposes. Thus, the individual and relative dimensions shown in the drawings are not to be considered limiting. Finally, it should be readily appreciated that the adjectives used to specify spatial relationships (e.g., forward, rearward, horizontal, vertical, rear, front) indicate spatial relationships as they exist when the subject components are located in their intended orientation within the vehicle 10.

The vehicle 10 includes an interior compartment, such as passenger compartment 12, having vehicle interior structure, which is represented collectively herein by an instrument panel 14 (also known as a "dashboard" or "fascia"), a center console 16, and a glove compartment or glove box 18 of conventional design. The instrument panel 14 extends transversely across the vehicle 10, at a forward end of the passenger compartment 12. The instrument panel 14 is configured to house various switches, accessories, and instrumentation, including, for example at the driver side, an electronic instrument cluster 20 with various digital or analog gauges—e.g., speedometer, odometer, and tachometer (none of which are visible in the drawings), or, at the front passenger side, heating, ventilation, and air conditioning (HVAC) vents 22 and the glove compartment 18. The center console 16 originates at the instrument panel 14, and continues beneath it, running rearward in the passenger compartment 12 between front driver and passenger seat assemblies (not shown). A sloped, front windshield (or "front window") 24 extends crosswise along the forward most portion of the passenger compartment 12, intersecting a complementary forward edge 26 of the instrument panel 14.

Referring to both FIGS. 1 and 2, the instrument panel 14 has opposing, substantially parallel inner and outer surfaces 28 and 30, respectively, which define various sections of the instrument panel 14, represented herein by upper, middle, and lower portions, indicated respectively by reference numerals 32, 34 and 36. The upper and lower portions 32, 36 extend in a generally rearward direction (i.e., from front to back of vehicle 10), with the middle portion 34 extending therebetween in a generally vertical orientation, slightly angled or sloped in a forward direction. The upper portion 32 of the trim panel 14 is positioned forward of, and oblique to the middle portion 34 relative to the vehicle 10. As seen in FIG. 2, the upper portion 32 extends from the forward edge 26 of the instrument panel 14 in a generally horizontal fashion.

The instrument panel 14 (which is also referred to herein as "trim panel") is designed to cover or conceal various underlying components when installed in the motorized vehicle 10. For instance, the instrument panel 14 overlies a plurality of HVAC ducts (not shown), assorted wiring clusters (not shown), and one or more supplemental inflatable restraint systems, such as a passenger-side airbag device, designated in the aggregate as 50 in FIG. 2. Specifically, with regard to the latter, the instrument panel 14 defines a cavity, indicated generally as 38, with an opening or deployment port 40 (FIG. 2A) that is formed through the upper portion 32 thereof, facing in a generally upward direction relative to the vehicle 10. The cavity 38 extends generally downward into an internal hollow of the instrument panel 14, and is configured to nest the supplemental inflatable restraint system (e.g., passenger-side airbag device 50) therein.

FIG. 2 provides a side-view illustration of the instrument panel 14 of FIG. 1, cut-away to illustrate the airbag device 50 that is enclosed therein. The airbag device 50 includes an inflatable cushion or flexible membrane 52 that is in fluid communication with an inflation fluid dispensing apparatus or inflator 54, both of which are shown operatively oriented within the cavity 38 in FIG. 2. The inflation fluid dispensing apparatus 54 acts as a pyrotechnic pressure vessel, used to store and discharge inflation gas. That is, the inflation fluid dispensing apparatus 54 is selectively actuable (e.g., via electronic signaling through electric terminals 42) to provide a fluid, preferably in the nature of a pressurized gas such as nitrogen, argon, or carbon dioxide, for deploying the cushion 52 outward and rearward into the vehicle passenger compartment 12 (FIG. 1). For example, the inflatable cushion 52 is shown in a first, non-expanded stowable state in FIG. 2, wherein the inflatable cushion 52 is inside the cavity 38 in a deflated and folded condition. Upon activation of the inflation fluid dispensing apparatus 54, the inflatable cushion 52 transitions through the opening 40 in the instrument panel 14 to a second, expanded state (indicated with hidden lines at 52A in FIG. 2A), in which the inflatable cushion 52 is substantially outside the cavity 38 in an inflated condition. It should be recognized that the passenger-side airbag device 50 may be used in conjunction with, or independent of a traditional driver-side airbag assembly.

The instrument panel 14 also includes an integrally formed deployment door 44 (also referred to as a "closeout door"), preferably of sufficient length and width to cover and obstruct the opening 40, and conceal the stowed cushion 52. For example, the deployment door 44 may consist of a "U-shaped" portion of the instrument panel, which is defined by a tear seam 45 that extends along three sides of the door 44. The tear seam 45 may be formed by any conventional method, inclusive of, but not exclusive to, hot knifing, pressurized water jet, laser cutting, etc. It should be appreciated, however, that the deployment door 44 may be fabricated as a separate element, and subsequently operatively attached to the instrument panel 14 without departing from the intended scope of the claimed invention.

The deployment door 44 is configured to transition in a forward motion from a first, substantially closed position, in which the deployment door 44 covers substantially all of the opening 40 (as seen in FIG. 2), to a second, generally open position, in which the deployment door 44 sufficiently uncovers the opening 40 such that the inflatable cushion 52 can selectively deploy therethrough (as seen in FIG. 2A) without inhibiting its progress. More specifically, upon inflation of the inflatable cushion 52 to the expanded state 52A, the closeout door 44 is pushed, pressed, or forced to the second, generally open position 44A under the inflation pressure of the expanding cushion. For example, as the cushion 52 inflates, a force will tend to build up along the underside of the closeout door 44 until the cushion 52 pushes through the closeout door 44, expanding through opening 40 into the passenger compartment 12.

With continued reference to FIG. 2, a soft chute 56 is engineered to partially house and direct deployment of the inflatable cushion 52. The soft chute 56 includes an upper reinforcing panel 58 with a plurality of wall members 60 that extend generally orthogonally downward into cavity 38. The soft chute 56 is mounted along reinforcing panel 58 to the inner surface 28 of instrument panel 14 (e.g., via vibration or sonic welding, heat stakes, fasteners, adhesive, etc.), at the upper portion 32 thereof. The reinforcing panel 58 defines an aperture 62 therethrough (best seen in FIG. 2A), which is preferably geometrically identical to and coextensive with the opening 40. It should be readily apparent that the present invention may be practiced with or without the soft chute 56.

The wall members 60 of the soft chute 56 cooperate to define a passage or channel through which the cushion 52 extends upon deployment. The soft chute 56, namely upper panel portion 58, is oriented and contemporaneously mounted such that the aperture 62 is generally aligned with the opening 40 formed through upper portion 32 of the trim panel 14. In so doing, the soft chute 56 acts to operatively align the inflatable cushion 52 with the opening 40 for deployment therethrough.

The soft chute 56 is also configured to attach the airbag device 50 to the trim panel 14. In accordance with the exemplary embodiment of FIG. 2, each of the wall members 60 includes a plurality of slots 64 that are configured (i.e., dimensioned and oriented) to receive and mate with a respective snap fastener 66 that protrudes from an outer periphery of the airbag device 50. Once properly mated, the snap fasteners 66 securely lock the airbag device 50 in place, and properly align the inflatable cushion 52 with the soft chute 56 to ensure unobstructed migration through the opening 40 and aperture 62. As would be recognized by those having ordinary skill in the art, the airbag device 50 may be attached to the soft chute 56 via alternate means, such as with one or more bolts or fasteners, an adhesive, or other mechanical coupling methods.

A soft chute door 68 is integrated with (i.e., formed in or attached to) the soft chute 56. The soft chute door 68 is preferably of sufficient length and width to cover the aperture 62 and conceal the stowed cushion 52. The soft chute door 68, for example, is shown in FIG. 2 in a first, substantially closed position, in which the soft chute door 68 obstructs substantially all of the aperture 62 and, thus, opening 40. Similar to the instrument panel deployment door 44, the airbag cushion 52 functions to transition the soft chute door 68 from the first position (seen in FIG. 2) to a second, generally open position (as seen in FIG. 2A). More specifically, upon inflation of the inflatable cushion 52 to the expanded state 52A, the soft chute door 68 is pushed, pressed, or forced open to the second position, in which the soft chute door 68 sufficiently exposes the opening 40 and aperture 62 such that the inflatable cushion 52 can selectively deploy therethrough without inadvertent impediments.

According to FIGS. 2-2A, the soft chute door 68 pivots or rotates about a laterally oriented hinge portion 70 to transition in a forward motion from the first position (FIG. 2) to the second position (FIG. 2A). In this particular embodiment, the laterally oriented hinge portion 70 is preferably a contoured channel that extends transversely from a forward peripheral edge of the aperture 62, adjacent a frontward portion of the upper reinforcing panel 58. To ensure that the two door members—i.e., deployment door 44 and soft chute door 68, transition substantially simultaneously to their respective open positions, an outer interface surface 72 of the soft chute door 68 preferably abuts or presses against, and may additionally be adhered or mechanically fastened to an inner interface surface 74 of the deployment door 44.

Figure 4:
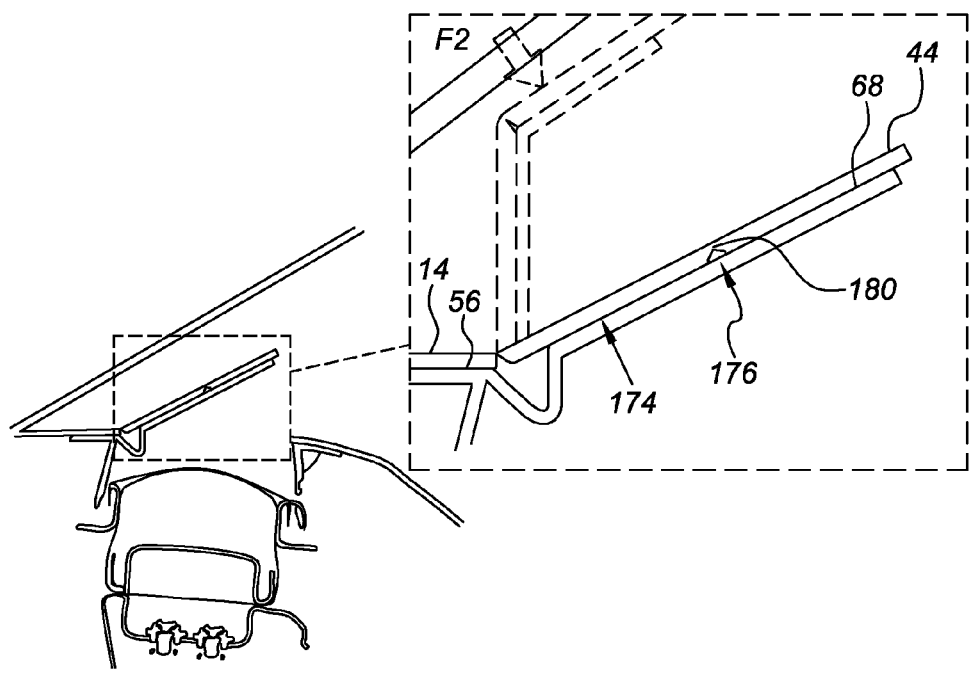
FIG. 4 is an enlarged side-view illustration of the top-mount deployment door and soft chute door of FIG. 2 depicting the top-mount deployment door with a bend initiator in accordance with another embodiment of the present invention.
Figure 5:
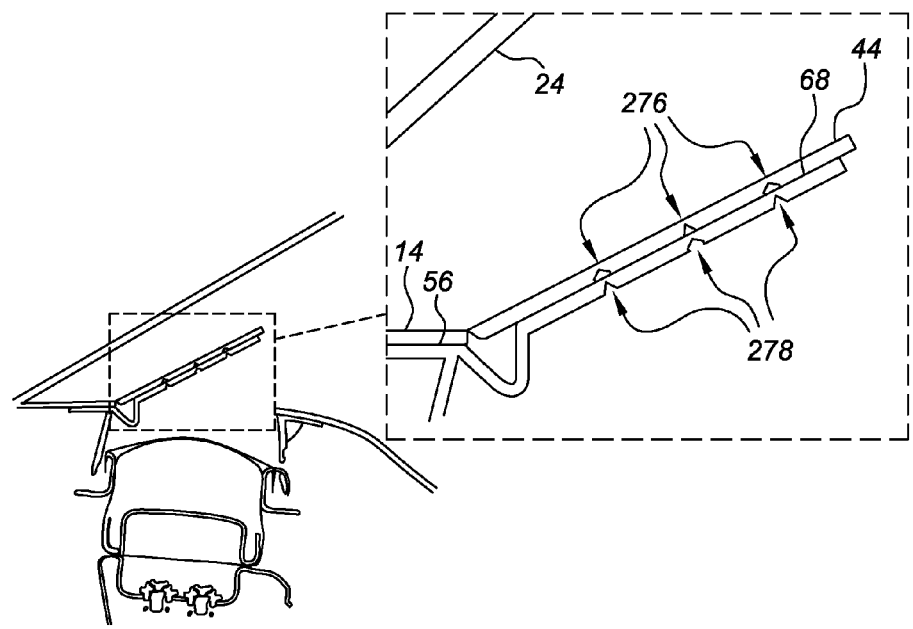
FIG. 5 is an enlarged side-view illustration of the top-mount deployment door and soft chute door of FIG. 2 depicting the soft chute door and top-mount deployment door both having a plurality of bend initiators in accordance with an alternative embodiment of the present invention.

FIGS. 3-5 are enlarged side-view illustrations of the top-mount deployment door 44 and soft chute door 68 of FIG. 2. Each of the aforementioned FIGURES illustrates one or both of the door arrangements 44, 68 with one or more bend initiators in accordance with the various embodiments of the present invention. As will be understood from the following description, each bend initiator is configured to attenuate kinetic energy transferred to the vehicle windshield 24 by the deployment door 44 upon contact therebetween. The bend initiator enhancement minimizes the energy projected into the windshield 24 by allowing the deployment door 44 to fold or collapse onto itself under a predetermined load. In so doing, the bend initiators in accordance with the present invention decrease the necessary swing clearance to the windshield 24 and, thus, provide more freedom of motion for the deployment door 44. For simplicity and brevity, like reference numbers are used in FIGS. 3 through 5 to refer to like components from FIGS. 1-2A. Correspondingly, the components of FIGS. 3-5 identified with a common reference number to a respective component in FIGS. 1-2A should be considered identical unless specified otherwise.

Turning to FIG. 3, the soft chute door 68 is shown with a bend initiator, indicated generally at 76, in accordance with one embodiment of the present invention. In this particular embodiment, the bend initiator 76 is defined by a reduced thickness portion 80 that is molded into an inside surface 78 of the soft chute door 68. The bend initiator 76 of FIG. 3 is configured as a triangular channel that extends generally laterally along at least a portion of the soft chute door 68. The bend initiator 76—i.e., reduced thickness portion 80, is designed to weaken the soft chute door 68 and thereby collapse the same in response to a predetermined force (illustrated for explanatory purposes in FIG. 3 by hidden arrow F1) transferred to the soft chute door 68 by the windshield 24 upon contact therebetween. It is by this means that deployment door 44 and soft chute door 68 absorb and thereby mitigate the amount of kinetic energy transferred to the windshield 24 that is generated by deployment of the inflatable cushion 52. Notably, the shape, orientation, dimensions, and overall length of the bend initiator 76 may be individually or collectively modified to provide a specific, predetermined level of kinetic energy management and attenuation, depending upon the intended application of the interior trim arrangement—e.g., instrument panel 14, deployment door 44, soft chute 56, and soft chute door 68.

As an alternative to the embodiment of FIG. 3, the deployment door 44 may include a bend initiator in accordance with another embodiment of the present invention, as indicated at 176 in FIG. 4. In this particular embodiment, the bend initiator 176 is defined by a reduced thickness portion 180 that is formed into the inner interface surface 174 of the deployment door 44. The bend initiator 176 of FIG. 4 is configured as a pentagonal score line that extends generally laterally along at least a portion of the deployment door 44. The bend initiator 176—i.e., reduced thickness portion 180, is designed to weaken the deployment door 44 and thereby collapse the same in response to a predetermined force (illustrated for explanatory purposes in FIG. 4 by hidden arrow F2) transferred to the deployment door 44 by the windshield 24 upon contact therebetween. It is in this manner that deployment door 44 and soft chute door 68 absorb and attenuate the energy transferred to the windshield 24 that is generated by deployment of the inflatable cushion 52. Notably, the shape, orientation, dimensions, and overall length of the bend initiator 176 may be individually or collectively modified to provide a specific, predetermined level of kinetic energy management and attenuation, depending upon the intended application of the interior trim arrangement.

Figure 6A:
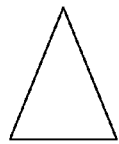
FIGS. 6A-6E are schematic illustrations of various alternative geometric configurations for the bend initiators of the present invention.
Figure 6B:
Figure 6C:
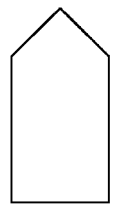
Figure 6D:
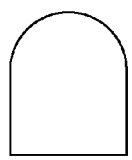
Figure 6E:

As seen in the embodiment of FIG. 5, the deployment door 44 and soft chute door 68 may each include a plurality of bend initiators, respectively indicated by reference numerals 276 and 278, in accordance with an alternate embodiment of the present invention. It should be readily apparent from the illustrations in FIGS. 3-5 that each door member 44, 68 may include identical or dissimilar bend initiators, or a combination thereof, and may include the same or a different number of bend initiators without departing from the intended scope of the present invention. In addition, FIGS. 6A-6E provide schematic illustrations of various alternative geometric configurations for the bend initiators of the present invention. Specifically, the bend initiators 76, 176, 276 and 278 of FIGS. 3-5 may take on a triangular profile (FIG. 6A), a rectangular profile (FIG. 6B), a pentagonal profile (FIG. 6C), a dome-shaped profile (FIG. 6D), and/or a fork-shaped profile (FIG. 6E).

While the best modes for carrying out the present invention have been described in detail herein, those familiar with the art to which this invention pertains will recognize various alternative designs and embodiments for practicing the invention within the scope of the appended claims.

The invention claimed is:

1. An interior trim arrangement adapted in part to house a supplemental inflatable restraint system therein when installed in a motorized vehicle, the vehicle having a windshield, and the supplemental inflatable restraint system including an inflatable cushion, the trim arrangement comprising:
   a trim panel configured to attach to the vehicle, said trim panel having opposing inner and outer surfaces defining an upper portion adjacent to a middle portion, said trim panel defining a cavity with an opening formed through said upper portion, said cavity configured to nest the supplemental inflatable restraint system therein;
   a soft chute mounted to said inner surface of said trim panel such that an aperture defined therethrough is generally aligned with said opening, said soft chute configured to operatively align the inflatable cushion with said opening;
   a soft chute door integrated with said soft chute and configured to transition from a first position, in which said soft chute door substantially obstructs said opening, to a second position, in which said soft chute door sufficiently exposes said opening such that the inflatable cushion can selectively deploy therethrough; and
   a deployment door integrated with said trim panel and configured to transition from a closed position, in which said deployment door substantially covers said opening, to a generally open position, in which said deployment door sufficiently uncovers said opening such that the inflatable cushion can selectively deploy therethrough;
   wherein said deployment door includes at least one bend initiator formed therein and configured to attenuate kinetic energy transferred to the windshield by said deployment door upon contact therebetween.

2. The trim arrangement of claim 1, wherein said at least one bend initiator includes a reduced thickness portion extending generally laterally along at least a portion of said deployment door.

3. The trim arrangement of claim 2, wherein said at least one bend initiator includes a plurality of bend initiators.

4. The trim arrangement of claim 1, wherein said soft chute door includes a second at least one bend initiator formed therein and configured to further attenuate kinetic energy transferred to the windshield by said deployment door upon contact therebetween.

5. The trim arrangement of claim 4, wherein said second at least one bend initiator includes a second reduced thickness portion extending generally laterally along at least a portion of said soft chute door.

6. The trim arrangement of claim 5, wherein said second at least one bend initiator includes a second plurality of bend initiators.

7. The trim arrangement of claim 6, wherein said soft chute door pivots about a generally laterally oriented hinge portion extending along a forward-most edge of said soft chute to transition from said first position to said second position.

8. The instrument panel of claim 7, wherein an outer interface surface of said soft chute door abuts against an inner interface surface of said deployment door.

9. The trim arrangement of claim 1, wherein said deployment door is a U-shaped door.

10. The trim arrangement of claim 9, wherein said deployment door is integrally formed into said trim panel.

11. The trim arrangement of claim 1, wherein said upper portion of said trim panel is oriented forward of and oblique to said middle portion relative to the vehicle.

12. The trim arrangement of claim 11, wherein said upper portion of said trim panel is generally horizontal and said middle portion is generally vertical.

13. An interior trim arrangement adapted in part to house a supplemental inflatable restraint system therein when installed in a motorized vehicle, the vehicle having a windshield, and the supplemental inflatable restraint system including an inflatable cushion, the trim arrangement comprising:
   a trim panel configured to attach to the vehicle, said trim panel having opposing inner and outer surfaces defining an upper portion adjacent to a middle portion, said trim panel defining a cavity with an opening formed through said upper portion, said cavity configured to nest the supplemental inflatable restraint system therein;
   a deployment door integrated with said trim panel and configured to transition from a closed position, in which said deployment door substantially covers said opening, to a generally open position, in which said deployment door sufficiently uncovers said opening such that the inflatable cushion can selectively deploy therethrough;
   a soft chute mounted to said inner surface of said trim panel such that an aperture defined therethrough is generally aligned with said opening, said soft chute configured to attach the supplemental inflatable restraint system to said trim panel and operatively align the inflatable cushion with said opening; and
   a soft chute door integrated with said soft chute and configured to transition from a first position, in which said soft chute door substantially obstructs said opening, to a second position, in which said soft chute door sufficiently exposes said opening such that the inflatable cushion can selectively deploy therethrough;
   wherein at least one of said deployment door and said soft chute door includes at least one bend initiator formed therein and configured to attenuate kinetic energy transferred to the windshield by said deployment door upon contact therebetween.

14. A vehicle having a passenger compartment and a front windshield, the vehicle comprising:
   an instrument panel operatively oriented at a forward end of the passenger compartment, said instrument panel having opposing inner and outer surfaces defining an upper portion positioned forward of and oblique to a middle portion, said instrument panel defining a cavity with an opening formed through said upper portion;
   an inflatable cushion operable to selectively transition through said opening from a non-expanded state, in which said cushion is nested inside said cavity, to an expanded state, in which said cushion is substantially outside said cavity;
   a fluid dispensing apparatus in fluid communication with said cushion and operable to regulate the selective transition of said cushion from said non-expanded state to said expanded state;
   a soft chute mounted to said inner surface of said instrument panel such that an aperture defined through an upper reinforcing portion thereof is generally aligned with said opening, said soft chute configured to operatively attach to and align said inflatable cushion with said opening;

a soft chute door integrated with said soft chute and configured to transition in a forward motion from a first position, in which said soft chute door substantially obstructs said aperture and said opening, to a second position, in which said soft chute door sufficiently exposes said aperture and said opening such that the inflatable cushion can selectively deploy therethrough; and a deployment door integrated with said instrument panel and configured to transition in a forward motion from a closed position, in which said deployment door substantially covers said opening, to a generally open position, in which said deployment door sufficiently uncovers said opening such that said inflatable cushion can deploy therethrough when transitioning from said non-expanded state to said expanded state;

wherein said deployment door includes a reduced thickness portion formed in and extending generally laterally along at least a portion of an inside surface thereof, said reduced thickness portion configured to weaken said deployment door and thereby collapse the same in response to a predetermined force transferred thereto by the windshield upon contact therebetween.

15. The vehicle of claim 14, wherein said reduced thickness portion includes a plurality of reduced thickness portions.

16. The vehicle of claim 14, wherein said soft chute door includes a second reduced thickness portion formed in and extending generally laterally along at least a portion of an interior surface thereof, said second reduced thickness portion configured to weaken said soft chute door and thereby collapse the same in response to a second predetermined force transferred thereto by the windshield upon contact therebetween.

17. The vehicle of claim 16, wherein said second reduced thickness portion includes a second plurality of reduced thickness portions.

18. The vehicle of claim 17, wherein said deployment door is a U-shaped door.

\* \* \* \* \*